United States Patent [19]

van der Linden

[11] Patent Number: 4,687,920

[45] Date of Patent: Aug. 18, 1987

[54] ELECTRONIC CIRCUIT FOR DETERMINING THE POSITION OF A LIGHT SPOT ON A POSITION-SENSITIVE DETECTOR

[75] Inventor: Bernardus G. van der Linden, Zoetermeer, Netherlands

[73] Assignee: B.V. Optische Industrie "De Oude Delft", Netherlands

[21] Appl. No.: 792,751

[22] Filed: Oct. 30, 1985

[30] Foreign Application Priority Data

Nov. 2, 1984 [NL] Netherlands ......................... 8403331

[51] Int. Cl.$^4$ ............................................. G01J 1/32
[52] U.S. Cl. .................................... 250/205; 250/230; 330/308
[58] Field of Search .............. 250/203 S, 205, 231 SE, 250/561, 230, 203 R; 330/59, 308; 315/151, 158

[56] References Cited

U.S. PATENT DOCUMENTS

| 3,453,528 | 7/1969 | Gall | 250/230 X |
| 3,828,188 | 8/1974 | Matula | 250/231 SE |
| 4,260,882 | 4/1981 | Barnes | 250/205 |

FOREIGN PATENT DOCUMENTS 0647529  2/1979  U.S.S.R. ............................ 250/205

Primary Examiner—Eugene R. LaRoche
Assistant Examiner—S. Mottola
Attorney, Agent, or Firm—Louis E. Marn

[57] ABSTRACT

An electronic circuit for determining the position of a light spot produced by a light source (4, 22) on a position-sensitive detector (4,22) having a center terminal (2) and two end terminals (3, 3'). Circuitry is provided for keeping the current (I) applied to the center contact of the position-sensitive detector at a constant level, which circuitry includes means (9) for measuring the current and means (10-18) for compensating for variations in this current by controlling the luminous intensity of the light source (1, 25).

8 Claims, 4 Drawing Figures

ELECTRONIC CIRCUIT FOR DETERMINING THE POSITION OF A LIGHT SPOT ON A POSITION-SENSITIVE DETECTOR

The invention relates to an electronic circuit for determining the position of a light spot produced by a light source on a position-sensitive detector having a centre terminal and two end terminals.

Position-sensitive detectors consisting of an elongate body coated with a photosensitive layer under which a resistive path is provided, have been available for some time. When a light beam strikes the photosensitive layer, a conductive path between the point of incidence of the light beam and the underlying resistive path is formed. The detector includes a centre terminal for the application of voltage to the photosensitive layer and end terminals that are each connected to one of the ends of the resistive path. At the point of incidence of the light beam, current will flow from the centre terminal to the resistive path and will there be split up into a current to one end terminal and a current to the other end terminal. The magnitudes of these currents depend on the resistances of the two path sections and hence on the point of incidence of the light beam.

As the total resistance value of the resistive path is known and constant, information on the point of incidence can be obtained by determining the magnitudes of the two partial currents, subsequently determining the sum and the difference of these currents and then dividing the difference by the sum.

A drawback inherent in the prior art electronic circuit for determining the position of a light spot on a position-sensitive detector is that, in this circuit, first the sum and the difference of the currents have to be determined and then a division has to be made. This not only requires additional components but has an adverse effect on the accuracy of the measurement, a relatively large error being liable to occur especially in the making of the division.

It is an object of the invention to solve this problem. To this end, in accordance with the invention a device of the aforesaid type is provided with circuitry for keeping the current applied to the centre terminal of the position-sensitive detector at a constant level, which circuitry includes means for measuring the current and means for compensating for variations in this current by controlling the luminous intensity of the light source.

When the magnitude of the current flowing through the photosensitive surface of the detector to the resistive path is kept constant, as this is done in accordance with the invention, the determination of the position of the point of incidence of the light beam on the detector requires neither a determination of the sum and the difference of the two partial currents nor a computation of the quotient of this sum and difference. In fact, information on the magnitude of one of the two partial currents provides sufficient information on the position of the point of incidence as the sum of the two currents is constant.

A problem encountered in keeping the current at a constant level is, however, that this current depends on the intensity of the light spot on the detector. Especially when using the position-sensitive detector in an angle detector, such dependence will cause problems. The invention provides a solution to these problems too.

For determining the angular position of a rotary member, such as a shaft, a mirror can be connected to this shaft and a light beam from a light source can be directed towards this mirror, which beam is reflected towards a position-sensitive detector. The point where the focussed light beam strikes the position-sensitive detector is then indicative of the (angular) position of the mirror and hence of the angular position of the shaft. However, due to variations in the length of the light path, the diameter of the light spot on the position-sensitive detector will vary with its position on this detector. For example, the diameter of the light spot at a point of incidence near the centre of the detector will be larger than that at a point of incidence near the extremities thereof. Such variation will cause the total current flowing through the photosensitive layer of the detector to the resistive path to vary too. In accordance with the invention, however, variations in the total current flowing to the position-sensitive detector are sensed and utilized for controlling the intensity of the light source, so that the total current can be kept constant irrespective of the point of incidence of the light beam on the detector.

It is further possible to connect either the position-sensitive detector or the light source to the rotary member and fixedly mount the other of the two in a frame relative to which the rotary member rotates, in such a manner that the light source directly irradiates the detector without the intervention of, for example, a mirror or a similar reflective surface.

An embodiment of the circuit according to the invention will be described in greater detail hereinafter with reference to the accompanying drawings, in which.

Figure 1:
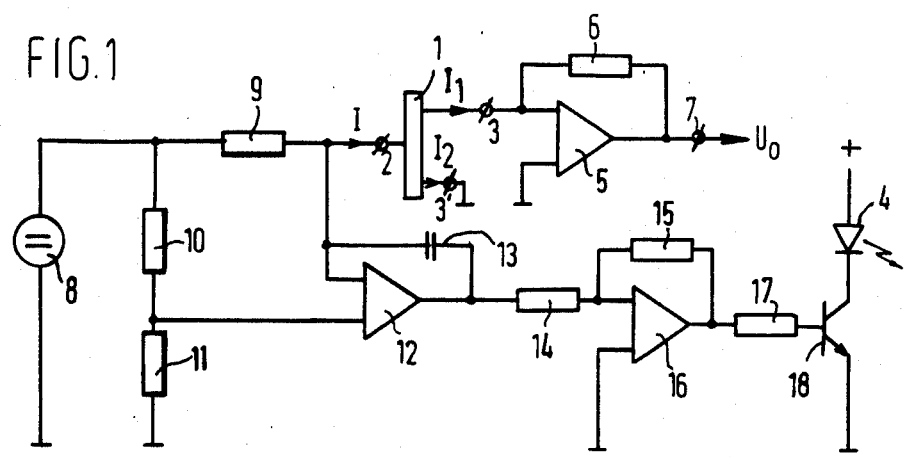
FIG. 1 shows the schematic wiring diagram of the electronic circuit according to the invention.

In FIG. 1, reference numeral 1 denotes a position-sensitive detector, for example a detector of the S1352 type produced by the Hamamatsu Corporation. Such a detector has a centre terminal 2 and end terminals 3 and 3'. During operation, a light beam from a light source 4 is directed towards the detector, causing the photosensitive surface of the detector to become conductive at the point of incidence of the light beam on this surface and a resultant current I to flow from centre terminal 2 to end contacts 3 and 3'. A resistive path of constant resistance is provided between contacts 3 and 3' and the point of incidence of the light beam on the detector is decisive of the magnitude of the current $I_1$ flowing to contact 3 and the current $I_2$ flowing to contact 3'.

So, when the light beam strikes the detector surface at a point near contact 3, practically all of the current will flow to contact 3 as the path between this point and contact 3 presents a low resistance whereas practically no current will flow to contact 3' as the path between the point of incidence and this contact presents a high resistance. The division of current I into currents $I_1$ and $I_2$ is thus determined by the point of incidence of the light beam on the detector surface and, as the total resistance of the path between contacts 3 and 3' is known and constant, information on the position of the point of incidence can be obtained by measuring these currents $I_1$ and $I_2$.

If, in accordance with the invention, current I is kept constant, a measurement of only one of currents $I_1$ and $I_2$ suffices for obtaining adequate information on the point of incidence of the light beam.

In accordance with the embodiment described, consequently, current I is kept constant, current $I_2$ is discharged to ground and current $I_1$ is supplied to an operational amplifier 5 connector in feedback relationship with a resistor 6. A voltage $U_O$ indicative of the magnitude of current $I_1$ is presented at the output terminal 7 of amplifier 5, which output voltage can be processed in a manner known to the worker in the art to indicate the point of incidence of the light beam on position-sensitive detector 1.

Current is supplied from a DC voltage source 8 through a resistor 9 to position-sensitive detector 1. The voltage across resistor 9 is measured and kept constant by means of a feedback loop, so that current I flowing to detector 1 is constant. The feedback loop is arranged as follows.

A reference voltage is derived from DC voltage source 8 by dividing the DC voltage by means of two resistors 10 and 11. Presented at the junction point of these resistors, the reference voltage is applied to one input of an operational amplifier 12 connected with a feedback capacitor 13 to be operative as an integrator. Operational amplifier 12 has its other input connected to the junction point of resistor 9 and the centre terminal of position-sensitive detector 1.

Variations in the voltage across resistor 9 are applied by the integrating operational amplifier 12 through a resistor 14 to a operational amplifier 16 connected with a feedback resistor 15 to be operative as an amplifier. The amplified output voltage of operational amplifier 16 is applied through a resistor 17 to a transistor 18 connected in common emitter configuration. The light source 4 is included in the collector lead of transistor 18 and is a light emitting diode having its anode connected to a suitable positive voltage source and its cathode connected to the collector electrode of transistor 18.

The integrating operational amplifier 12 serves to stabilize the feedback loop and further has a noise suppressing function.

Variations in the current I through resistor 9 due to changes in the position of the point of incidence of the light beam from light emitting diode 4 on the position-sensitive detector are measured and used to control the intensity of the light beam emitted by LED 4, so that current I remains constant indeed.

It will be clear that the invention provides a very simple circuit for determining the position of a light spot on a position-sensitive detector, in which the accuracy of the measurement is not affected by variations in the intensity of the light spot. The measurement is all the more accurate as no quotient needs to be determined but one of the partial currents, $I_1$ in the embodiment described, can be converted highly accurately by means of an operational amplifier into an output voltage that is indicative of the position of the light spot on the detector.

Figure 2:
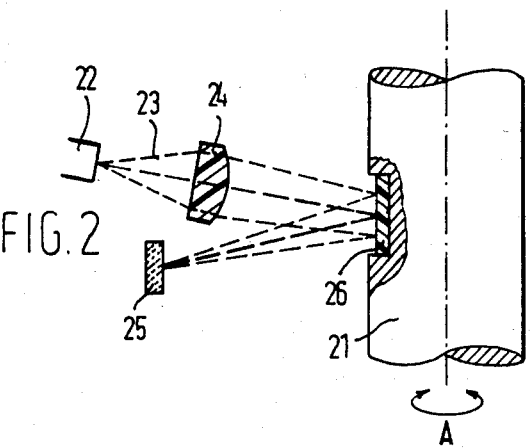
FIG. 2 shows a device for measuring the angular position of a shaft in which the circuit according to the invention can be used.

FIG. 2 shows a device for measuring the angular position of a shaft 21. A light source 22, for example a light emitting diode, emits a light beam 23. A singular lens 24 focusses beam 23 via a mirror 26 onto the position-sensitive detector 25 shown in cross-sectional view. Mirror 26 is mounted in shaft 21. Light source 22 and position-sensitive detector 25 are fixedly mounted in a frame, not shown, relative to which the shaft 21 rotates. Shaft 21 performs a reciprocatory rotary movement as schematically indicated by arrow A. Position-sensitive detector 25 has its longitudinal dimension extending normal to the plane of the drawing. The position of the point of incidence of the focussed beam 23 on position-sensitive detector 25 changes in response to a change in the angular position of shaft 21. By applying the electronic circuit shown in FIG. 1, the instantaneous angular position of shaft 21 can be determined with high accuracy. In spite of its high degree of accuracy, the angle measuring device in question is of particularly small size, i.e. $4 \times 4 \times 2$ cm in a practical realization, not including the electronic circuit.

Figure 3:
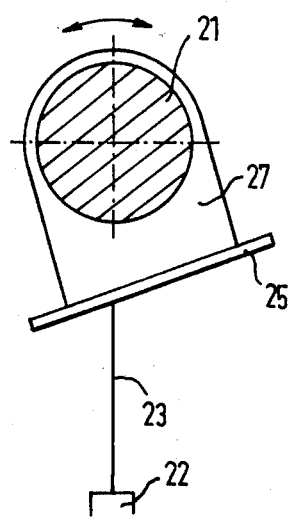
FIG. 3 shows another arrangement of a device for measuring the angular position of a shaft.

FIG. 3 shows a second arrangement of a device for measuring the angular position of shaft 21. A platform 27 having position-sensitive detector 25 mounted thereon is secured to shaft 21. Light source 22 is arranged for emitting a collimated light beam 23. A change in the angular position of shaft 21 results in a change in the point of incidence of beam 23 on detector 25. The position of the point of incidence is determined by means of the electronic circuit of FIG. 1 and the voltage indicative of this position is presented at output terminal 7 for application to a known per se display device or control device for adjusting shaft 21.

Figure 4:
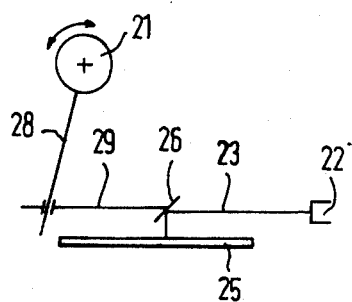
FIG. 4 shows yet another arrangement of a device for measuring the angular position of a shaft.

FIG. 4 schematically shows a further arrangement of a device for measuring the angular position of a shaft. A rod 28 is coupled to shaft 21, which rod is slidably and pivotally connected to a rod 29 mounted for reciprocatory motion in, in the drawing, horizontal direction in parallel with the longitudinal dimension of position-sensitive detector 25. A mirror 26 is attached to rod 29. Light source 22 emits a beam 23 of collimated light into a direction parallel with the axis of rod 29. Mirror 26 reflects beam 23 towards detector 25. A change in the angular position of shaft 21 results in a change in the angular position of rod 28 and hence in a change in the position of rod 29, mirror 26 and the point of incidence of beam 23 on detector 25. Just as in the other arrangements, the position of the point of incidence is determined by means of the electronic circuit of FIG. 1 and the voltage indicative of this position is presented at output terminal 7 for application to the appropriate measuring, control or display device connected to this terminal.

I claim:

1. An electronic circuit for determining the position of a light spot produced by a light source on a position-sensitive detector having a centre terminal and two end terminals, characterized by the provision of circuitry for keeping a current applied to the centre terminal of the position-sensitive detector at a constant level, which circuitry includes means for measuring the current and means for compensating for variations in said current by controlling the luminous intensity of the light source.

2. A circuit according to claim 1, characterized in that the circuitry for measuring the current and compensating for variations in said current includes a resistor traversed by said current, an integrating circuit and an amplifying circuit, said integrating and amplifying circuits being connected in cascade and being operative to convert the voltage drop across said resistor into a control signal for the light source.

3. A circuit according to claim 1 or 2, characterized in that the part of the current that flows to one of the end terminals of the position-sensitive detector is indicative of the position of the light spot on said detector.

4. A circuit according to claim 3, characterized by the provision of an amplifying circuit for converting the partial current into an output voltage.

5. A circuit according to claim 3 or 4, characterized in that the other of the end terminals is connected to ground.

6. A device for measuring the angular position of a rotary member, characterized by an electronic circuit in accordance with any one of the preceding claims, and by means for changing the position of the light spot on the position-sensitive detector in dependence upon the angular position of the rotary member.

7. A device according to claim 6, characterized in that the rotary member rotates relative to the stationarily mounted light source and position-sensitive detector is relative to which and in that a mirror is connected to the rotary member for movement therewith so as to reflect the light from the light source towards the position-sensitive detector.

8. A device according to claim 7, in which the rotary member is a shaft, characterized in that the mirror is mounted on said shaft.

* * * * *